(12) United States Patent
Tochio

(10) Patent No.: US 8,441,923 B2
(45) Date of Patent: May 14, 2013

(54) COMMUNICATION PATH PROVIDING METHOD AND COMMUNICATION APPARATUS

(75) Inventor: Yuji Tochio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 398 days.

(21) Appl. No.: 12/828,839

(22) Filed: Jul. 1, 2010

(65) Prior Publication Data

US 2011/0007628 A1 Jan. 13, 2011

(30) Foreign Application Priority Data

Jul. 9, 2009 (JP) ................................. 2009-162389

(51) Int. Cl.
*H04L 12/26* (2006.01)

(52) U.S. Cl.
USPC ............ 370/222; 370/242; 370/249; 709/251

(58) Field of Classification Search ........................ None
See application file for complete search history.

(56) References Cited

U.S. PATENT DOCUMENTS

| | | | | |
|---|---|---|---|---|
| 6,526,020 B1 * | 2/2003 | Ando | ............................ | 370/223 |
| 2002/0172150 A1 * | 11/2002 | Kano | ............................ | 370/216 |
| 2003/0048747 A1 | 3/2003 | Tazawa et al. | | |
| 2003/0147345 A1 | 8/2003 | Takagi et al. | | |
| 2005/0207348 A1 | 9/2005 | Tsurumi et al. | | |
| 2006/0092856 A1 | 5/2006 | Mitsumori | | |
| 2006/0215544 A1 | 9/2006 | Asa et al. | | |
| 2007/0047467 A1 * | 3/2007 | Enoki et al. | ..................... | 370/254 |
| 2008/0159126 A1 | 7/2008 | Takagi et al. | | |
| 2008/0304407 A1 * | 12/2008 | Umansky et al. | .............. | 370/222 |
| 2009/0052317 A1 * | 2/2009 | Takagi et al. | ................. | 370/223 |
| 2009/0147675 A1 * | 6/2009 | Sekihata | ......................... | 370/225 |
| 2009/0175166 A1 * | 7/2009 | Long et al. | ..................... | 370/225 |
| 2009/0262643 A1 * | 10/2009 | Zhao et al. | ...................... | 370/217 |
| 2009/0323521 A1 * | 12/2009 | Tochio | ............................ | 370/225 |

FOREIGN PATENT DOCUMENTS

| | | |
|---|---|---|
| JP | 2003-0147345 | 8/2003 |
| JP | 2003-229876 | 8/2003 |
| JP | 2006-270169 | 10/2006 |

* cited by examiner

*Primary Examiner* — Hassan Phillips
*Assistant Examiner* — Duc Duong
(74) *Attorney, Agent, or Firm* — Staas & Halsey LLP

(57) ABSTRACT

A method provides a communication path in a ring network having a plurality of communication nodes. The method includes: setting transfer information of data in each of the plurality of communication nodes by making the transfer information correspond to connection information for identifying a connection within the ring network to provide a first communication path; determining whether to update the transfer information in each of the communication nodes according to the position where the fault occurs; and updating the transfer information according to the position where the fault occurs in one or more of communication nodes to provide a second communication path. Each of the plurality of communication nodes transfers input data by using the first or second communication path according to transfer information corresponding to connection information attached to the input data.

12 Claims, 17 Drawing Sheets

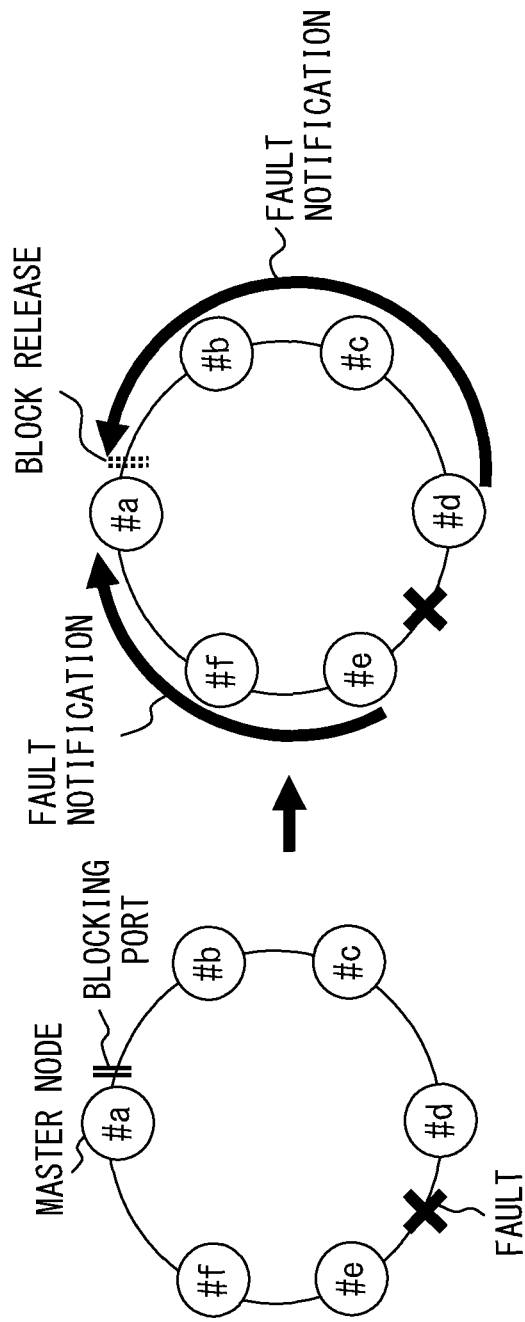

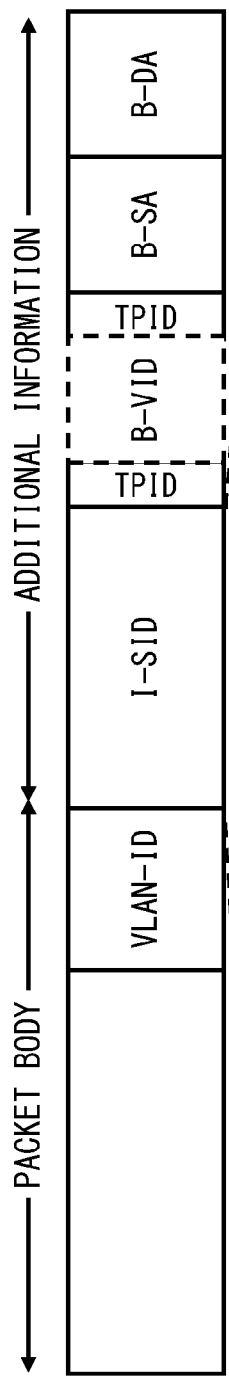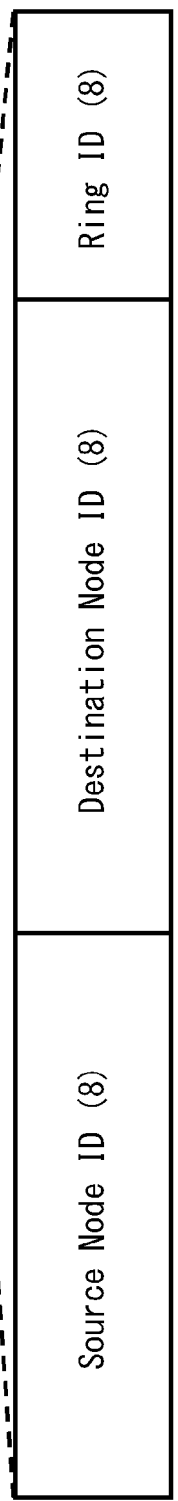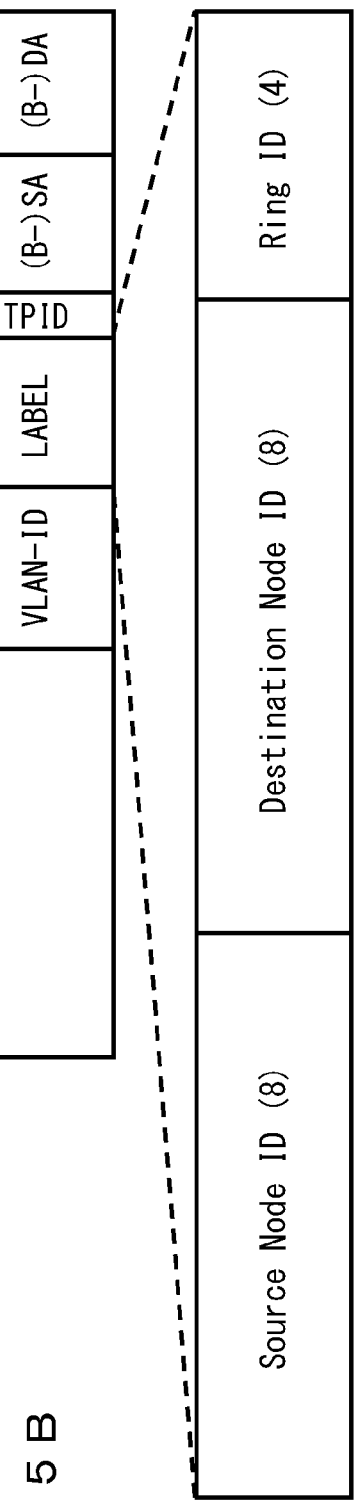

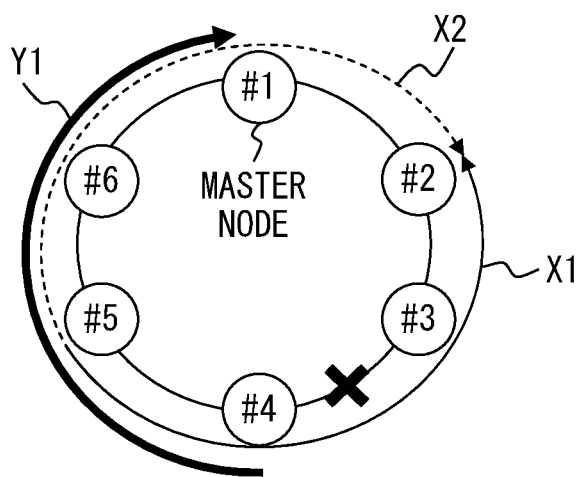
F I G. 9

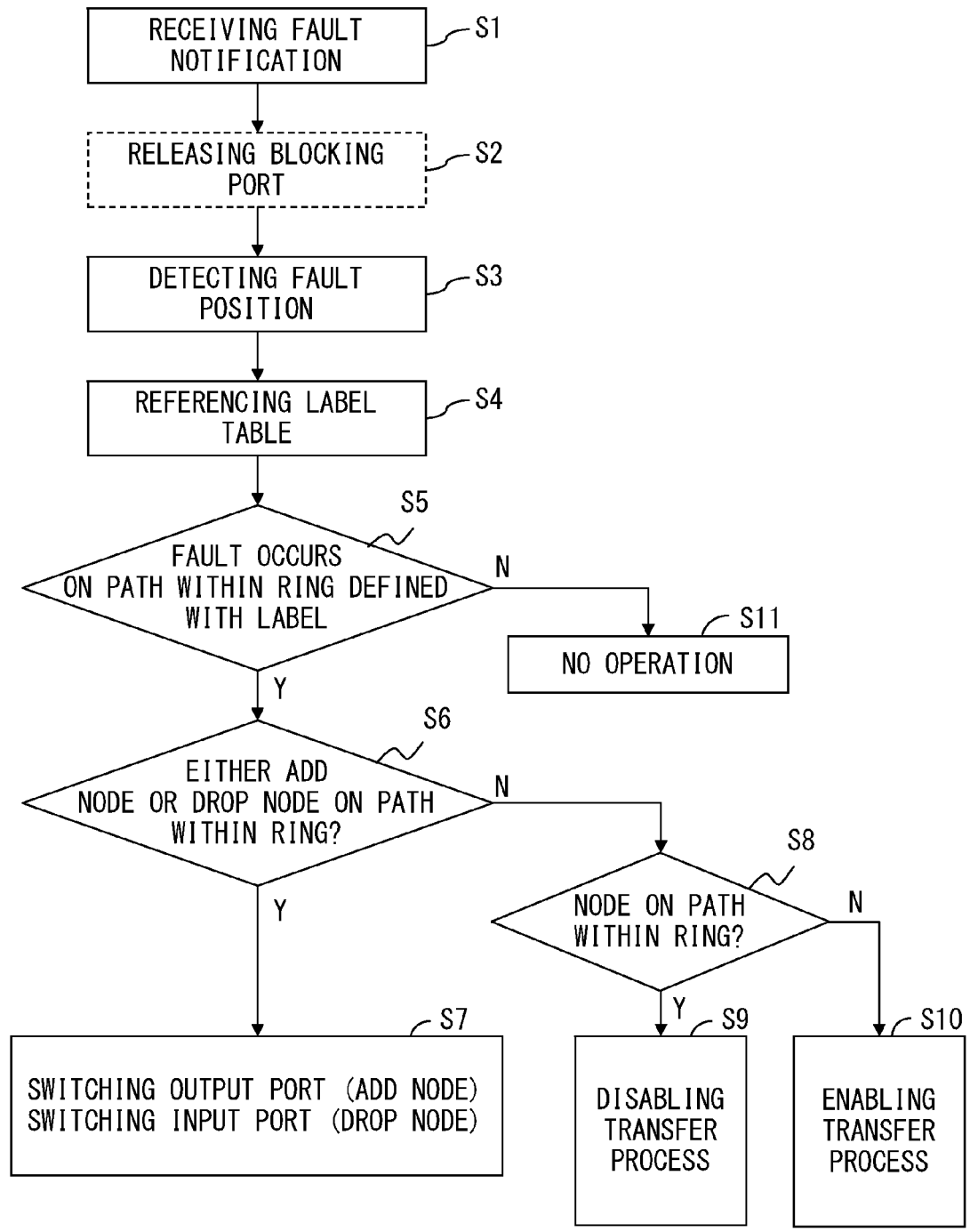
F I G. 1 1

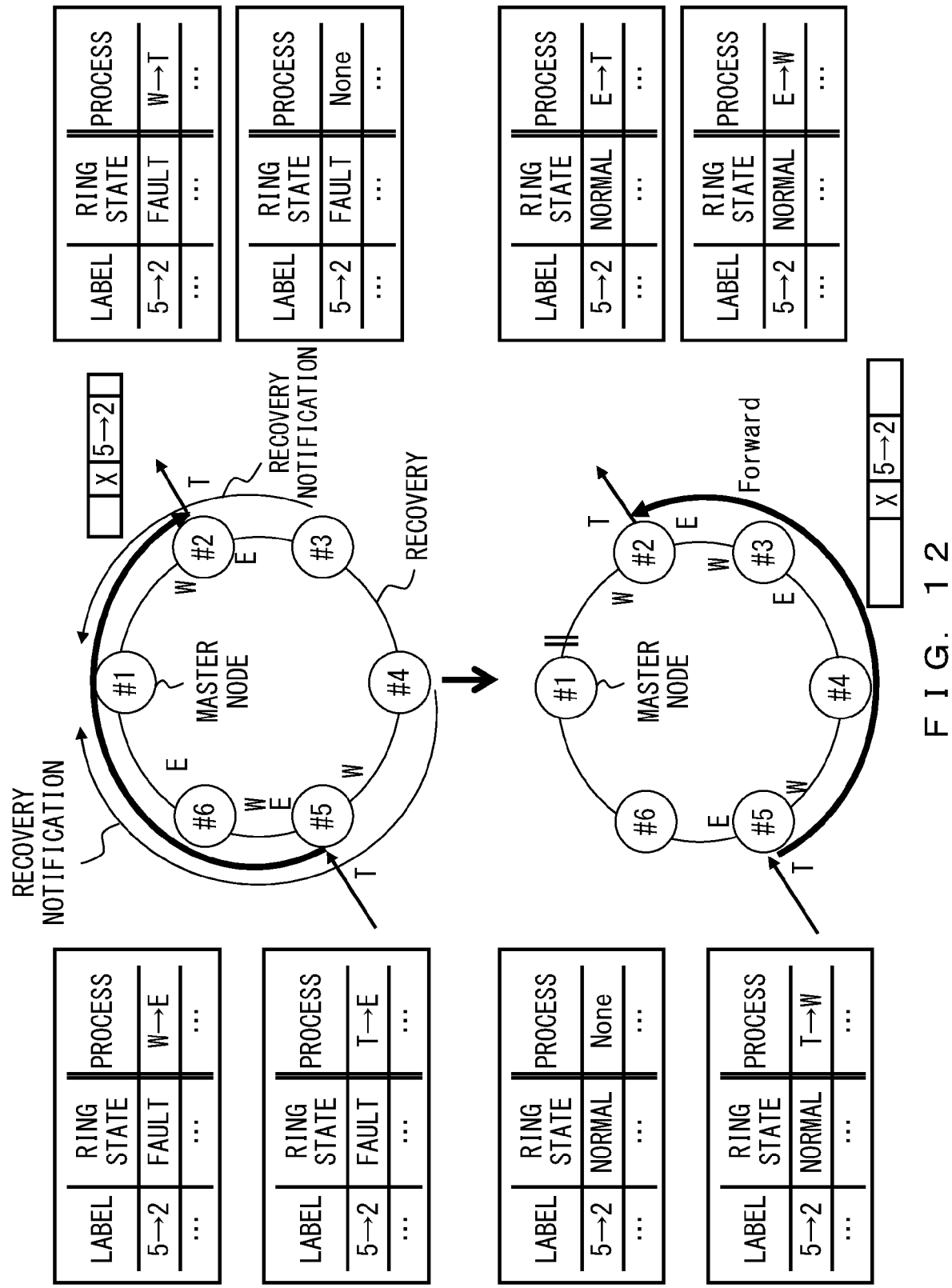
F I G. 12

COMMUNICATION PATH PROVIDING METHOD AND COMMUNICATION APPARATUS

CROSS-REFERENCE TO RELATED APPLICATIONS

This application is based upon and claims the benefit of priority of the prior Japanese Patent Application No. 2009-162389, filed on Jul. 9, 2009, the entire contents of which are incorporated herein by reference.

FIELD

The present invention relates to a communication apparatus used in a ring network, and to a method for providing a communication path in a ring network.

BACKGROUND

Ring networks have been put into practical use as one form of a network configuration. In a ring network, a transmission line cable (such as an optical fiber cable) may be efficiently wired. Moreover, systems for transmitting Ethernet (registered trademark) packets by using a ring network have been popularized.

In a ring network using Ethernet transmission technology, a transmission path of packets may become a loop. Therefore, a ring network has the problem of a so-called loop phenomenon (a state where packets continue to go around in a network, causing the volume of network traffic to be continuously heavy).

This problem is solved, for example, by a configuration for providing a blocking port. In examples illustrated in FIG. 1 and FIG. 2, a ring network includes communication nodes #a-#f, and communication node #a is defined as a master node. The master node provides a blocking port in order to prevent a loop from occurring. In the example illustrated in FIG. 1A, communication node #a terminates a packet between communication nodes #a and #b.

Additionally, it is preferable that a communication network has a function for automatically recovering from a fault. Also, for a ring network, a recovery function is proposed. Assume that a fault has occurred between communication nodes #d and #e as illustrated in FIG. 1A. In this case, communication nodes #d and #e respectively transmit a fault notification to the master node (here, communication node #a). Then, communication node #a releases the blocking port. This allows a packet to be transmitted between communication nodes #a and #b, and each of the communication nodes is able to transmit a packet to a desired communication node. At this time, communication nodes #d and #e may provide a blocking port.

When the fault between communication nodes #d and #e is recovered, communication nodes #d and #e respectively transmit a recovery notification to the master node as illustrated in FIG. 1B. Then, communication node #a provides the blocking port. Moreover, communication nodes #d and #e respectively release the blocking port according to an instruction issued from the master node. This procedure for recovering from a fault is proposed, for example, by ITU-T Recommendation G.8032.

Furthermore, a method for providing a connection communication by using the above described ring network has been proposed in recent years. For example, as illustrated in FIG. 2, a path that passes through communication nodes #f, #e, #d, and #c is established when data is transmitted from a transmitting station 101 to a receiving station 102.

As a related technique, a packet relay device that reduces a communication disconnection time by avoiding congestion occurring when a fault occurs or when a fault is recovered in a ring packet network is proposed (for example, Japanese Laid-open Patent Publication No. 2006-270169).

As another related technique, a configuration for protecting a frame that passes through an inter-ring bridge node when a fault occurs in the bridge node in a system including a plurality of ring networks is proposed (for example, Japanese Laid-open Patent Publication No. 2003-229876).

The conventional techniques have a problem in operations performed when a path that secures connectivity is set in a ring network, and a suitable or efficient redundant configuration is not implemented. Namely, in the conventional ring network illustrated in FIG. 1A and FIG. 1B, it was difficult to perform operations by applying an alternate path in advance because of the existence of a blocking port. In other words, the conventional techniques have a problem of being unable to sufficiently provide a redundant configuration.

SUMMARY

According to an aspect of an invention, a communication path providing method provides a communication path in a ring network having a plurality of communication nodes. One of the plurality of communication nodes is specified as a master node that provides a blocking port and releases the blocking port when a fault occurs in the ring network. The method includes: setting transfer information of data in each of the plurality of communication nodes by making the transfer information correspond to connection information for identifying a connection within the ring network to provide a first communication path; notifying the plurality of communication nodes of a position where a fault occurs when the fault occurs in the ring network; determining whether or not to update the transfer information in each of the communication nodes according to the position where the fault occurs; and updating the transfer information according to the position where the fault occurs in one or more of the plurality of communication nodes, and providing a second communication path having an originating node and a terminating node which are identical to the first communication path. Each of the plurality of communication nodes transfers input data by using the first or second communication path according to transfer information corresponding to connection information attached to the input data.

According to another aspect of the invention, a communication apparatus provided in each of a plurality of communication nodes in a ring network, includes: a memory to store transfer information for transferring data from an originating node of the ring network to a terminating node of the ring network via a first communication path with respect to connection information for identifying a connection within the ring network; an updating unit to update the transfer information according to a position of the communication apparatus upon receipt of a notification indicating that a fault occurs on the first communication path, and to provide a second communication path extending from the originating node to the terminating node; and a transferring unit to transfer input data by using the first or second communication path according to transfer information corresponding to connection information attached to the input data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A and 1B are explanatory views of a fault recovery in a ring network;

FIGS. 5A and 5B are explanatory views of a configuration of a packet and label information;

FIG. 9 is an explanatory view of a relationship between a position of a fault and a redundant path;

FIG. 11 is a flowchart illustrating operations of a communication node when a fault occurs;

FIG. 12 is an explanatory view of operations performed when a fault is recovered;

DESCRIPTION OF EMBODIMENTS

Figure 1B:
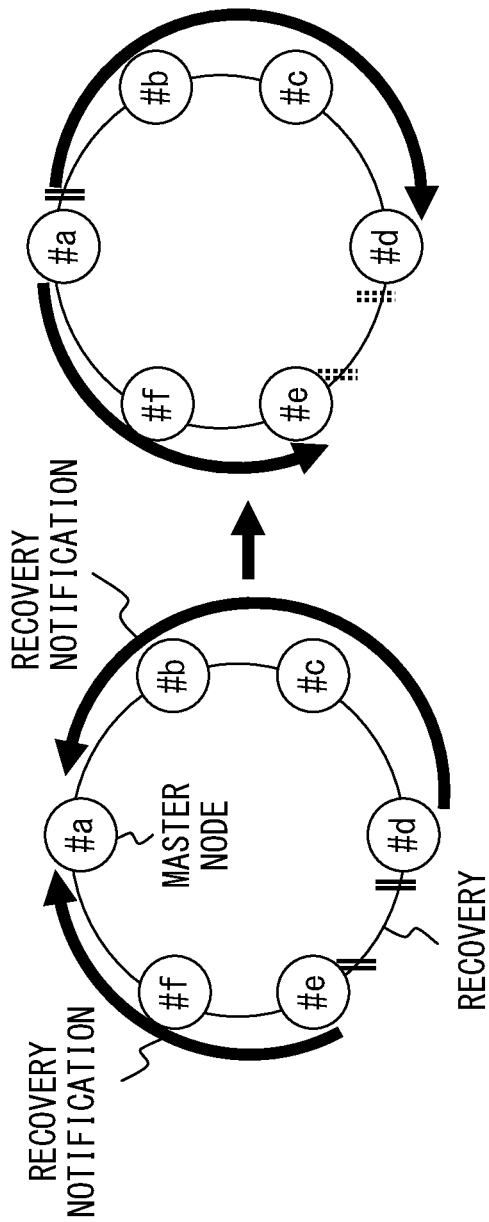
Figure 2:
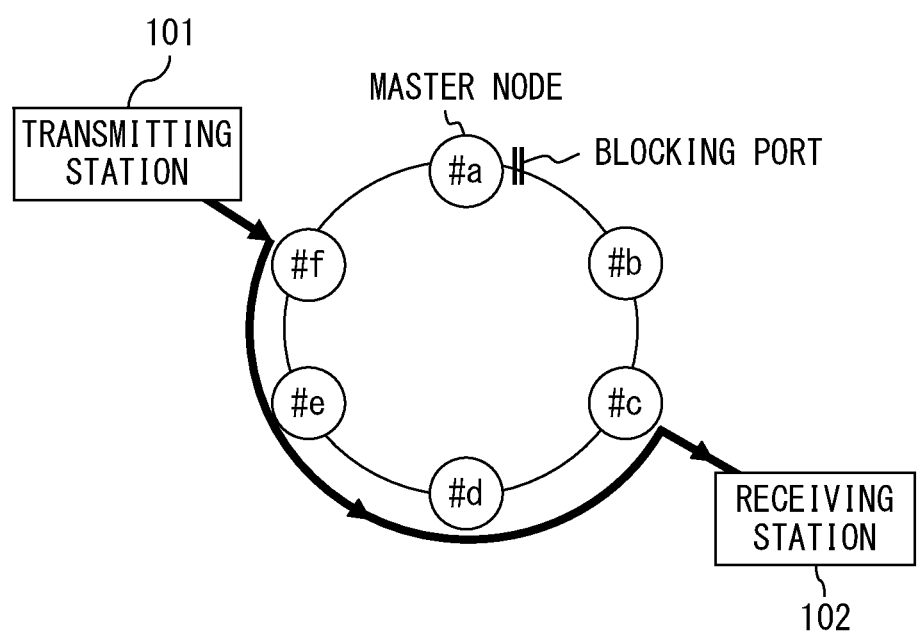
FIG. 2 is an explanatory view of a method for providing a connection communication by using a ring network.
Figure 3:
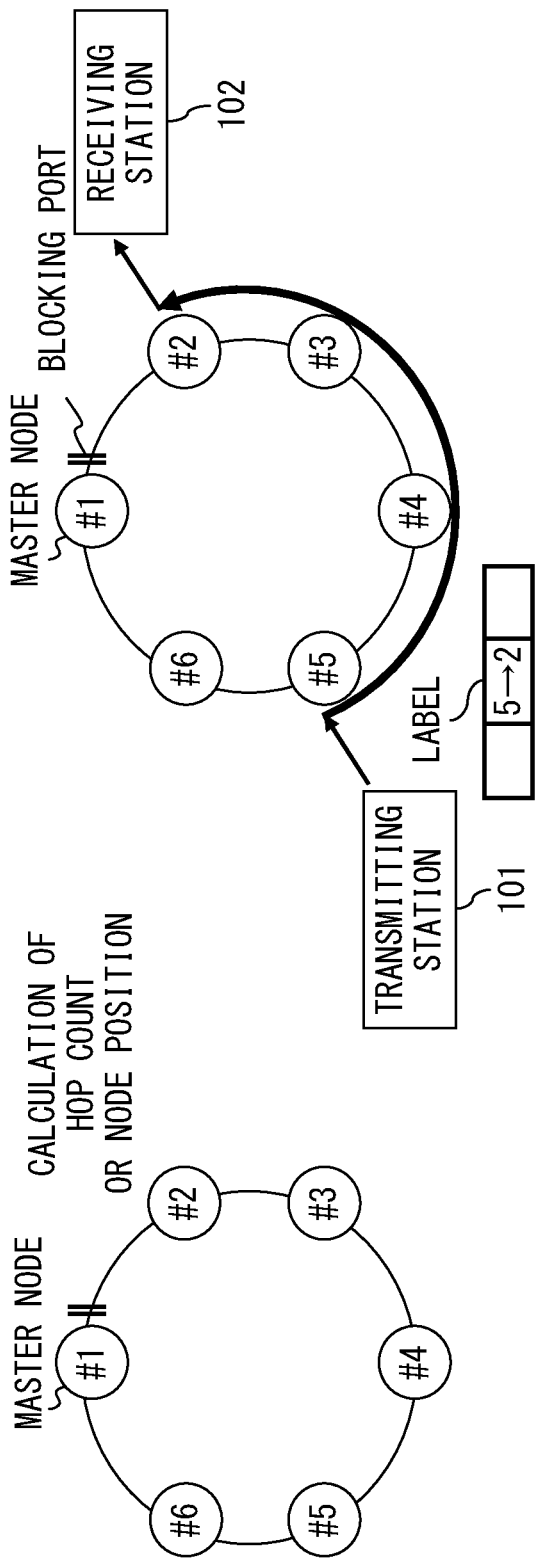
FIGS. 3A and 3B illustrate a configuration of a ring network according to the embodiment.

FIG. 3A and FIG. 3B illustrate a configuration of a ring network according to an embodiment. Assume that a transmission system is implemented, for example, according to ITU-T Recommendation G.8032 in the embodiment described below, although the implementation of the system is not particularly limited.

As illustrated in FIG. 3A, the ring network includes communication nodes #1-#6, and communication node #1 is defined as a master node. Identification numbers (#1-#6) respectively assigned to the communication nodes represent a hop count assigned when the communication nodes are counted clockwise from the master node as a reference. For example, communication node #2 is the first node clockwise from communication node #1, and communication node #3 is the second node clockwise from communication node #1. Accordingly, the communication nodes respectively recognize positions of the communication nodes based on the identification numbers (#1-#6) respectively assigned to the communication nodes. This ring network includes a network management system for managing the communication nodes, although the system is not particularly illustrated. The network management system manages the positions of the communication nodes by using the identification numbers (#1-#6).

The master node transmits a control packet for assigning an identification number to each of the communication nodes. In the control packet, TTL (Time to Live) is set, for example, by the master node. In this case, each of the communication nodes stores the TTL value of the received control packet, decrements the TTL value by 1, and transfers the control packet to the next communication node. In this way, each of the communication nodes identifies an identification number thereof by using the stored TTL value.

The communication nodes are interconnected by a communication cable. The communication cable may be an optical fiber cable or a metal cable. Moreover, this ring network is a bidirectional transmission system, and is able to transmit data clockwise and counterclockwise.

The master node (here, communication node #1) provides the blocking port in order to prevent a loop from being formed in the ring network. In the examples illustrated in FIG. 3A and FIG. 3B, communication node #1 terminates a packet between communication nodes #1 and #2.

This ring network provides a connection communication. In the example illustrated in FIG. 3B, a connection for transmitting data from the transmitting station 101 to the receiving station 102 is set. Namely, a packet transmitted from the transmitting station 101 is added to the ring network in communication node #5, and the packet is dropped in communication node #2 after being transmitted counterclockwise. At this time, this packet is transmitted via communication nodes #4 and #3 in the ring network. In this case, communication node #5 operates as an originating node of the connection within the ring, and communication node #2 operates as a terminating node of the connection within the ring.

To each packet transmitted via this connection, connection information that represents the above described connection within the ring is attached. The connection information includes information that specifies an add node (here, #5), and information that specifies a drop node (here, #2). The connection information is attached to each packet, for example, as a label (or a tag). Each of the communication nodes transfers a packet according to the label. However, it is not always necessary to attach, to each packet, a label (or a tag) that directly specifies an add node and a drop node.

Figure 4:
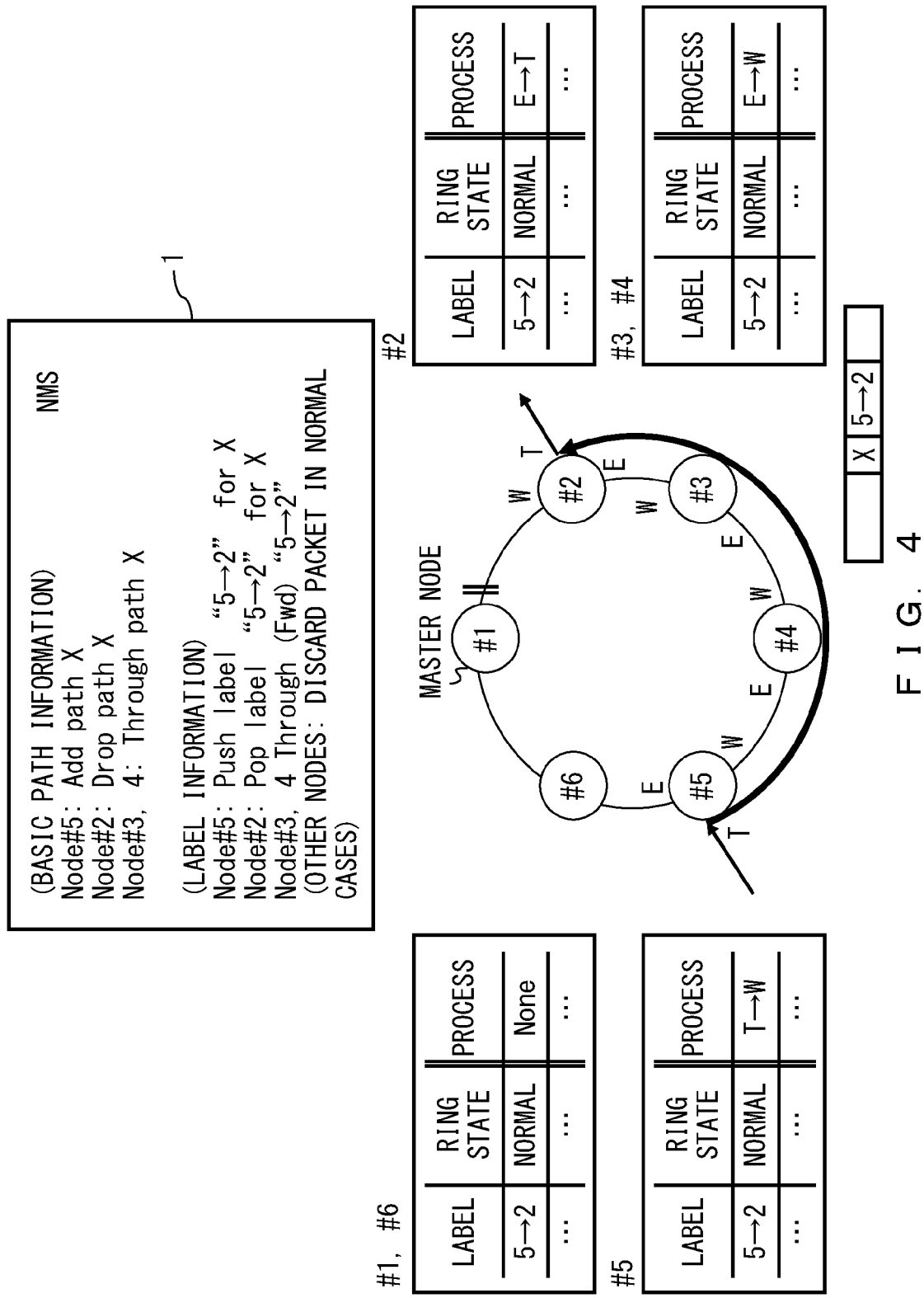
FIG. 4 is an explanatory view of settings of communication nodes.

FIG. 4 is an explanatory view of settings of communication nodes. Here, assume that a virtual LAN is configured by using the ring network. Also assume that a packet transmitted from the transmitting station is added in communication node #5, the packet is dropped in communication node #2, and the packet is guided to the receiving station in the virtual LAN. This virtual LAN is identified with "path ID=X" set by the network management system (NMS) 1. A communication path that extends from communication node #5 to communication node #2 and is set in the ring network in order to implement the virtual LAN is sometimes referred to as "path X" hereinafter.

Communication node #1 is the master node, and provides the blocking port. Namely, a communication path extending from communication node #5 to communication node #2 via communication nodes #6 and #1 is prohibited from implementing the above described connection. Accordingly, the network management system 1 provides a communication path extending from communication node #5 to communication node #2 via communication nodes #4 and #3 in order to implement the above described connection. This communication path is sometimes referred to as "path X1" hereinafter. The path X1 is one of the communication path to realize the path X.

The network management system 1 sets the following basic path information in each of the communication nodes in order to implement the path X1.
Communication node #1: None
Communication node #2: Drop a packet of the path X (Drop path X)

Communication node #3: Transfer a packet of the path X (Through X)
Communication node #4: Transfer a packet of the path X (Through X)
Communication node #5: Add a packet of the path X (Add path X)
Communication node #6: None Furthermore, the network management system 1 sets the following label information in each of the communication nodes in order to implement the path X1.
Communication node #1: None
Communication node #2: Delete label "5→2" from a packet of the path X (Pop label "5→2")
Communication node #3: Transfer a packet to which label "5→2" is attached (Through "5→2")
Communication node #4: Transfer a packet to which label "5→2" is attached (Through "5→2")
Communication node #5: Attach label "5→2" to a packet of the path X (Push label "5→2")
Communication node #6: None "5→2" is a label (or a tag) that is attached to each packet and is used in the ring network. Moreover, "5→2" indicates that communication nodes #5 and #2 are an add node and a drop node, respectively.

When being given the basic path information and the label information from the network management system 1, each of the communication nodes generates transfer information according to the label information and stores the transfer information. In this embodiment, assume that each of the communication nodes has communication ports T, W, and E. Communication port T is an input/output port for connecting the ring network and a network external thereto. Communication ports W and E are input/output ports for connecting to adjacent communication nodes within the ring network. Communication ports W and E respectively connect an adjacent communication node on an upstream side and a downstream side when data flows clockwise.

In communication node #5, the add node, transfer information "T→W" is set for the label "5→2". "T→W" indicates a process for guiding the packet input from communication port T to communication port W. In communication node #2, the drop node, transfer information "E→T" is set for the label "5→2". "E→T" indicates a process for guiding the packet input from communication port E to communication port T.

In communication nodes #4 and #3 provided on the communication path X1 extending between communication nodes #5 and #2, transfer information "E→W" is set for the label "5→2". "E→W" indicates a process for guiding the packet input from communication port E to communication port W. Moreover, transfer information "None" is set for the label "5→2" in communication nodes #1 and #6. "None" indicates a process for discarding the packet.

In each of the communication nodes, a ring state (normal, faulty and the like) is set for the label information. The ring state is updated, for example, according to a fault notification, a recovery notification, or the like.

FIG. 5A and FIG. 5B illustrate a configuration of a packet and the label information. As an example of the configuration of the packet, IEEE802.1ah (PBB: Provider Bridge Backbone) illustrated in FIG. 5A or MPLS (RFC3031) illustrated in FIG. 5B is allowed to be employed, although the configuration is not particularly limited.

If IEEE802.1ah is employed in the ring network according to the embodiment, the label information is implemented by using "I-SID". "I-SID" is a service instance identifier. In this case, "I-SID" has an 8-bit ring identifier (Ring ID), an 8-bit destination node identifier (Destination Node ID), and an 8-bit source node identifier (Source Node ID). "TPID" is a tag protocol identifier. "TPID" is, for example, "81-00 (hexadecimal notation)" in Ethernet. "(B)-SA" and "(B)-DA" respectively represent a source address and a destination address of a backbone. "B-VID" identifies a virtual LAN of the backbone. Information for identifying a virtual LAN ("path ID=X" in the above provided example) is written to, for example, a body of a packet.

If MPLS is employed in the ring network according to the embodiment, the label information is implemented by using "LABEL". "LABEL" has a 4-bit ring identifier (Ring ID), an 8-bit destination node identifier (Destination Node ID), and an 8-bit source node identifier (Source Node ID). Information for identifying a virtual LAN ("path ID=X" in the above provided example) is written to, for example, a body of a packet.

Referring back to FIG. 4, here, assume that the packet illustrated in FIG. 5A or 5B is added by communication node #5 in the ring network having the above described configuration. Also assume that "path ID=X" is written to the body of the packet at this time. However, note that label information is not set.

Upon receipt of the above described packet via communication port T, communication node #5 references the label information given by the network management system 1. In this embodiment, Push label "5→2" is set in communication node #5. Accordingly, communication node #5 attaches the label "5→2" to the received packet. At this time, in the format illustrated in FIG. 5A or 5B, "#5" and "#2" are written as a source node identifier and a destination node identifier, respectively. Then, communication node #5 references transfer information corresponding to the label "5→2". At this time, the transfer information "T→W" is set for the label "5→2" in communication node #5. Thus, communication node #5 outputs the packet via communication port W. Accordingly, this packet is transmitted to communication node #4.

Upon receipt of the packet via communication port E, communication node #4 references the label attached to the packet. Then, communication node #4 references the transfer information corresponding to the label. At this time, the transfer information "E→W" is set for the label "5→2" in communication node #4 Thus, communication node #4 outputs the packet via communication port W. Operations of communication node #3 are identical to those of communication node #4. Accordingly, the packet is transferred to communication node #2.

Upon receipt of the packet via communication port E, communication node #2 references the label attached to the packet. In communication node #2, Pop label "5→2" is set. Accordingly, communication node #2 deletes the label "5→2" of the packet. Furthermore, communication node #2 references the transfer information corresponding to the label "5→2". At this time, the transfer information "E→T" is set for the label "5→2" in communication node #2. Thus, communication node #2 outputs the packet via communication port T. Accordingly, this packet is transferred to the receiving station of the virtual LAN.

As described above, each of the communication nodes transfers a packet according to label information attached to the packet in the ring network according to the embodiment.

Figure 6:
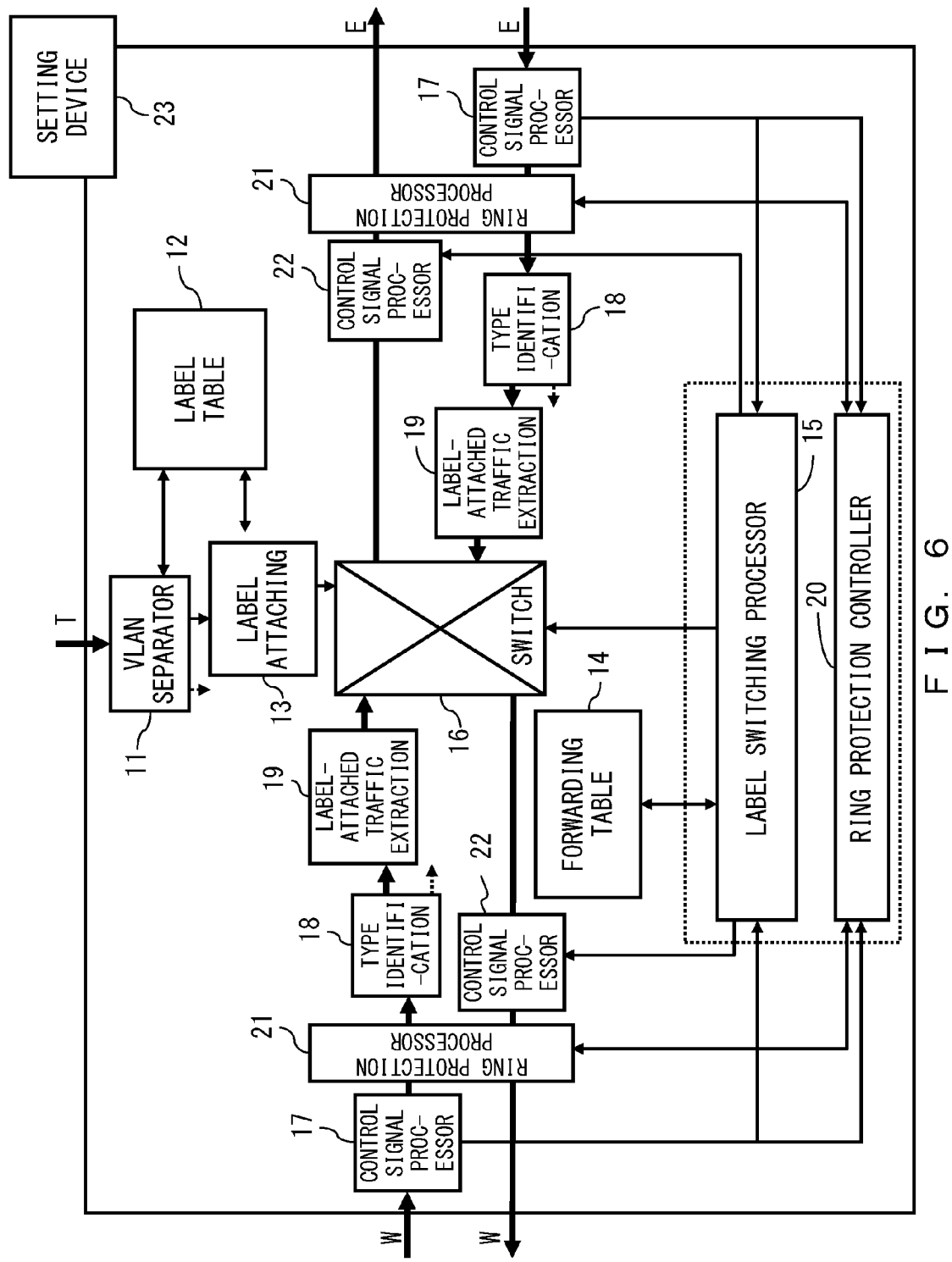
FIG. 6 illustrates a configuration of a communication node in the embodiment.

FIG. 6 illustrates a configuration of the communication node according to the embodiment. The communication node has communication ports T, W, and E as described above. FIG. 6 illustrates not all but some of components of the communication node.

A VLAN separator 11 extracts information for identifying a virtual LAN from a packet (namely, a packet flowing into the ring network) received via a communication port T. In the above described embodiment, for example, "path ID=X" is extracted. In a label table 12, a correspondence between the information for identifying a virtual LAN and label information used in the ring network is registered. The label table 12 is prepared on a memory. This correspondence is given, for example, by the network management system 1 as described above. The label table 12 is referenced by using the identification information extracted by the VLAN separator 11.

A label attaching unit 13 attaches, to the received packet, label information obtained from the label table 12. The label information includes identifiers for identifying an add node and a drop node as described above.

A forwarding table 14 stores transfer information for transferring a packet. The forwarding table 14 is prepared on a memory. The transfer information is given, for example, by the network management system 1 as described above. A label switching processor 15 updates the forwarding table 14 voluntarily or according to a notification (a fault notification, a recovery notification or the like) transmitted from another communication node. Moreover, the label switching processor 15 references the forwarding table 14 based on a label of a received packet, and controls a switch 16 according to a result of the reference.

The switch 16 guides a received packet to a specified communication port according to the control of the label switching processor 15. Namely, the switch 16 guides a packet received via communication port T to communication port W or E, guides a packet received via communication port W to communication port T or E, and guides a packet received via communication port E to communication port W or T.

A control signal processor 17 extracts a control signal from a packet received via communication port W or E, and transfers the control signal to the label switching processor 15 and a ring protection controller 20. The control signal is, for example, a fault notification, a recovery notification, and the like, which are transmitted from another node, in this embodiment. A type identifying unit 18 identifies, for example, an Ether type or the like. A label-attached traffic extracting unit 19 extracts label-attached traffic according to the Ether type identified by the type identifying unit 18.

The ring protection controller 20 controls ring protection according to the control signal extracted by the control signal processor 17. A ring protection processor 21 performs ring protection according to the control of the ring protection controller 20. The ring protection terminates (or rejects or discards) a packet other than a specified message. The ring protection is provided by the master node in normal operation state. However, when a fault occurs in the ring network, another communication node may provide the ring protection in some cases. A control signal processor 22 transmits the control signal via communication port W or E according to an instruction from the label switching processor 15. At this time, the control signal is multiplexed, for example, into normal traffic. An example of a multiplexing method is time division multiplexing, although the method is not particularly limited.

A setting device 23 transmits/receives necessary information to/from the network management system 1, and sets the label table 12 and the forwarding table 14. Each of the communication nodes has a function for removing a label from a packet output via communication port T, although this is not illustrated in FIG. 6.

Figure 7:
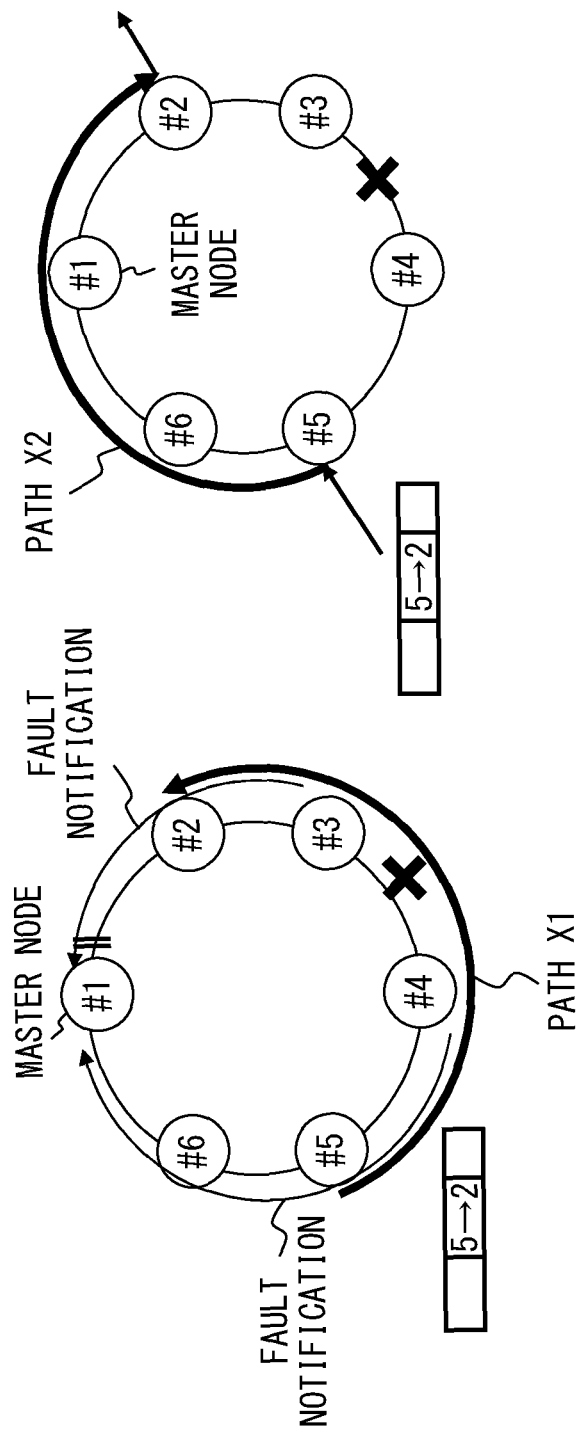
FIG. 7 and FIG. 8 are explanatory views of operations performed when a fault occurs.
Figure 8:
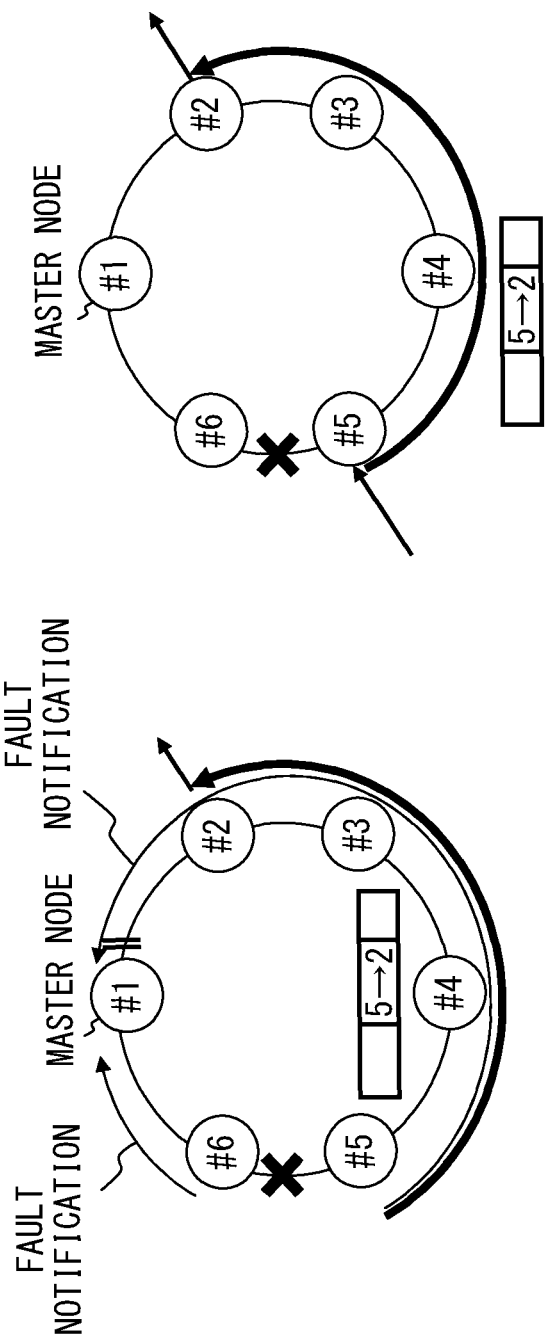

FIG. 7 and FIG. 8 are explanatory views of operations performed when a fault occurs. Assume that a counterclockwise communication path (namely, the path X1 that transfers a packet via communication nodes #4 and #3) is set between communication nodes #5 and #2 in the examples illustrated in FIG. 7 and FIG. 8.

In FIG. 7, assume that a fault occurs between communication nodes #3 and #4. Here, also assume that each of the communication nodes has a function for detecting a fault occurring between the local communication node and an adjacent communication node. For example, each of the communication nodes periodically transmits a fault monitoring message to the adjacent communication node(s). In this case, the communication node that has received the fault monitoring message returns a fault monitoring response message. Accordingly, each of the communication nodes detects an occurrence of a fault if the node does not receive the fault monitoring response message within a specified time period.

The fault that has occurred between communication nodes #3 and #4 is detected by communication nodes #3 and #4. Then, communication nodes #3 and #4 respectively generate and transmit a fault notification. The fault notification is generated, for example, by the control signal processor 22. Communication node #3 transmits the fault notification to the master node via a communication port on a side where the fault does not occur. Namely, the fault notification transmitted from communication node #3 is transferred to communication node #1 via communication node #2. Also, communication node #4 similarly transmits the fault notification to the master node via a communication port on the side where the fault does not occur. Namely, the fault notification transmitted from communication node #4 is transferred to communication node #1 via communication nodes #5 and #6.

In this embodiment, communication node #1 is the master node and provides the ring protection. That is, communication node #1 provides the blocking port. However, the fault notification is one of the specified messages that are allowed to pass through the blocking port, and the blocking port does not block the fault notification. Thus, the master node, communication node #1, receives and terminates the fault notification.

The fault notification includes information that represents the position where the fault has occurred. The position of the fault is represented, for example, with an address of a communication node that has detected the fault. In this case, the fault notification transmitted from communication node #3 includes "#3", and the fault notification transmitted from communication node #4 includes "#4". Thus, each of the communication nodes may detect the position of the fault. For the fault notification, byway of example, a format in G.8032 is available.

The position of the fault may be represented using another method. For example, the fault notification may be implemented with TTL. In this case, the communication node that has detected the fault generates and transmits a fault notification that includes a specified TTL value (such as 255) as an initial value. The TTL value is decremented by 1 every time the fault notification passes through each of the communication nodes. Accordingly, the communication node that has received the fault notification detects the position of the fault according to the TTL value.

Upon receipt of the fault notification, each of the communication nodes performs operations for providing a redundant path as needed. Initially, communication node #1, the master node, releases the ring protection. In the example illustrated in FIG. 7, the fault occurs on the path X1. Accordingly, communication node #5, the add node, transfers the packet, to which the label "5→2" is attached, clockwise. Moreover, communication nodes #6 and #1 forward the packet to which the label "5→2" is attached. Furthermore, upon receipt of the packet to which the label "5→2" is attached, communication node #2, the drop node, transfers the packet to the receiving station via communication port T.

Each of the communication nodes executes the above described switching process, whereby a communication path (hereinafter referred to as a path X2) extending from communication node #5 to communication node #2 via communication nodes #6 and #1 is provided for the label "5→2". Namely, when the fault illustrated in FIG. 7 occurs, the packet to which the label "5→2" is attached is transferred via the path X2. As described above, the ring network according to this embodiment allows a redundant configuration for each label (or for each connection).

In the example illustrated in FIG. 8, a fault occurs between communication nodes #5 and #6. In this case, communication nodes #5 and #6 respectively generate and transmit a fault notification. Thus, each of the communication nodes recognizes the position of the fault.

In the example illustrated in FIG. 8, however, the position of the fault is interposed between communication nodes #5 and #6, and is not located on the path X1 set for the label "5→2". Accordingly, none of the communication nodes execute the process for providing a redundant configuration for the label "5→2". Namely, none of the communication nodes perform operations for switching a communication path even though the fault illustrated in FIG. 8 has occurred.

As described above, in the ring network according to this embodiment, whether or not to provide a redundant configuration is determined for each label (or each connection) when a fault occurs in a ring. Assume that the path X1 identified with the label "5→2" and a path Y1 identified with a label "4→1" are set as illustrated in FIG. 9. Also assume that a fault occurs between communication nodes #3 and #4. That is, the fault occurs on the path X1 but does not occur on the path Y1. In this case, a redundant path X2 is provided for the path X1. However, a redundant path is not provided for the path Y1.

Figure 10:
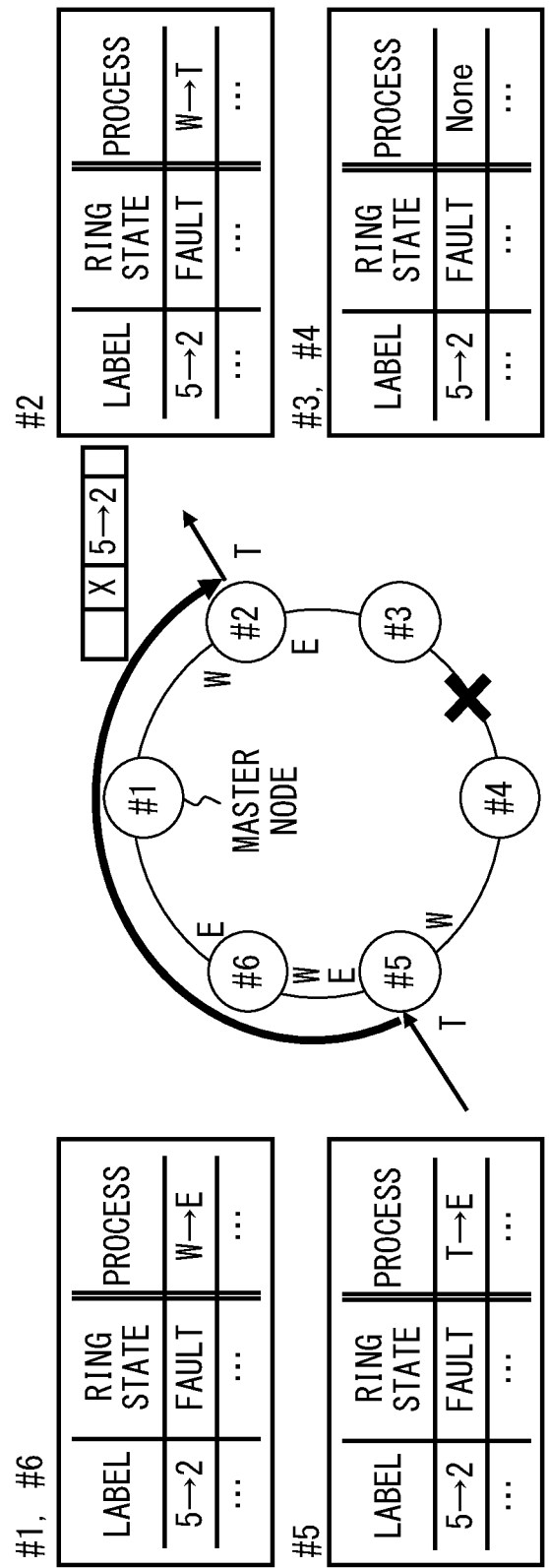
FIG. 10 is an explanatory view of details of operations performed when a fault occurs.

FIG. 10 is an explanatory view of details of operations performed when a fault occurs. Here, operations performed when a fault similar to that of FIG. 7 occurs are described. Namely, assume that the fault occurs between communication nodes #3 and #4, from which a fault notification is respectively transmitted.

In this case, in communication node #5, the add node, transfer information corresponding to the label "5→2" is updated from "T→W" to "T→E". In contrast, in communication node #2, the drop node, transfer information corresponding to the label "5→2" is updated from "E→T" to "W→T". Moreover, in communication nodes #3 and #4 located on the path X1, transfer information corresponding to the label "5→2" is updated from "E→W" to "None". Furthermore, in communication nodes #6 and #1, transfer information corresponding to the label "5→2" is updated from "None" to "W→E".

As a result, upon receipt of a packet to which "path ID=X" is attached, communication node #5 attaches the label "5→2" to the packet, and transfers the packet to communication node #6 based on the updated transfer information. Communication nodes #6 and #1 respectively forward the packet. Then, communication node #2 transfers the packet to the receiving station connected to the ring network.

FIG. 11 is a flowchart illustrating operations of the communication node when a fault occurs. Here, operations performed after the fault occurs in the ring network and a communication node that has detected the fault transmits a fault notification are described.

In step S1, a communication node receives the fault notification. Step S2 is executed by the master node. Namely, the communication node that is the master node releases the blocking port upon receipt of the fault notification. As a result, ring protection is released. In step S3, the label switching processor 15 detects the position of the fault based on the received fault notification. In step S4, the label switching processor 15 references the label table 12 (and the forwarding table 14), and executes processes insteps S5 to S11 for each label (or each connection).

In step S5, the label switching processor 15 determines whether or not a fault has occurred on a communication path that is identified based on label information. Here, assume that each of the communication nodes recognizes the position of the master node. Accordingly, the label switching processor 15 may determine whether or not the fault has occurred on the communication path identified with the label information, based on the position of the fault and the position of the master node. For instance, in the example illustrated in FIG. 7 or 10, communication node #1 is the master node. Then, a connection within the ring, which extends from communication node #5 to communication node #2, is unable to pass through communication node #1. Therefore, a communication path is formed so that the path extends from communication node #5 to communication node #2 via communication nodes #4 and #3. Namely, if a fault occurs between communication nodes #5 and #4, or between communication nodes #4 and #3, or between communication nodes #3 and #2 in this case, it is determined that the fault has occurred on the path within the ring. When the fault has occurred on the path within the ring, the flow goes to step S6.

In step S6, whether the communication node is either an add node (Ingress Node) or a drop node (Egress Node) of the path within the ring is checked. Information that represents an add node and a drop node for each path within the ring is given, for example, from the network management system 1 to each of the communication nodes as described above. If the communication node is the add node or the drop node, the flow goes to step S7.

In step S7, the label switching processor 15 switches an output port to the ring if the communication node is the add node. For instance, in the example illustrated in FIG. 10, the transfer information corresponding to the label "5→2" is updated from "T→W" to "T→E" in communication node #5. If the communication node is the drop node, the label switching processor 15 switches an input port from the ring. For instance, in the example illustrated in FIG. 10, the transfer information corresponding to the label "5→2" is updated from "E→T" to "W→T" in communication node #2. Note that the process in step S7 may be realized by updating the forwarding table 14.

If the communication node is neither the add node nor the drop node, the flow goes to step S8. Then, whether or not the communication node is located on the path within the ring is checked in step S8. If the communication node is located on the path within the ring, the label switching processor 15 disables the transfer information in step S9. For instance, in the example illustrated in FIG. 10, the transfer information corresponding to the label "5→2" is updated from "E→W" to "None" in communication nodes #3 and #4. In the meantime, if the communication node is not located on the path within the ring, the label switching processor 15 enables the transfer information in step S10. For instance, in the example illustrated in FIG. 10, the transfer information corresponding to the label "5→2" is updated from "None" to "W→E" in communication nodes #1 and #6. Note that the process in steps S9 and S10 may be realized by updating the forwarding table 14.

If the position of the fault is not located on the path within the ring ("No" in step S5), the flow goes to step S11. In this case, none of the communication nodes update the transfer information. Namely, the path set before the fault has occurred is maintained.

As described above, in the ring network according to the embodiment, whether or not to provide a redundant path is determined for each connection if a fault occurs in the ring. Namely, a redundant path is not always provided even if a fault occurs in the ring. Whether or not to provide a redundant path is determined according to a relationship between a route of a communication path for implementing each connection and the position of a fault. Accordingly, the path providing method according to the embodiment allows useless path switching to be suppressed.

FIG. 12 is an explanatory view of operations performed when a fault is recovered. Here, assume that the ring network recovers from the fault in a situation where a redundant path is provided due to the fault illustrated in FIG. 10.

When the fault occurring between communication nodes #3 and #4 is removed and the ring network recovers to a normal state, communication nodes #3 and #4 detect the recovery. Then, communication nodes #3 and #4 generate and transmit a recovery notification. At this time, communication node #3 transmits the recovery notification to communication node #2, whereas communication node #4 transmits the recovery notification to communication node #5. The communication nodes sequentially forward the recovery notification. As a result, each of the communication nodes detects the recovery of the ring network.

Upon receipt of the recovery notification, each of the communication nodes performs operations in reverse to those performed when the fault occurred. Namely, communication node #5, the add node, updates the transfer information corresponding to the label "5→2" from "T→E" to "T→W". Communication node #2, the drop node, updates the transfer information corresponding to the label "5→2" from "W→T" to "E→T". Communication nodes #6 and #1 update the transfer information corresponding to the label "5→2" from "W→E" to "None". Communication nodes #4 and #3 update the transfer information corresponding to the label "5→2" from "None" to "E→W".

When the transfer information of each of the communication nodes has been updated as described above, the ring network provides a communication path set before the fault occurred. Namely, upon receipt of a packet to which a virtual LAN identifier "path ID=X" is assigned, communication node #5 attaches the label "5→2" to the packet, and transmits the packet to communication node #4 according to the updated transfer information. Then, this packet is transferred to communication node #2 via communication nodes #4 and #3, and the packet is further transferred from communication node #2 to the receiving station.

Figure 13:
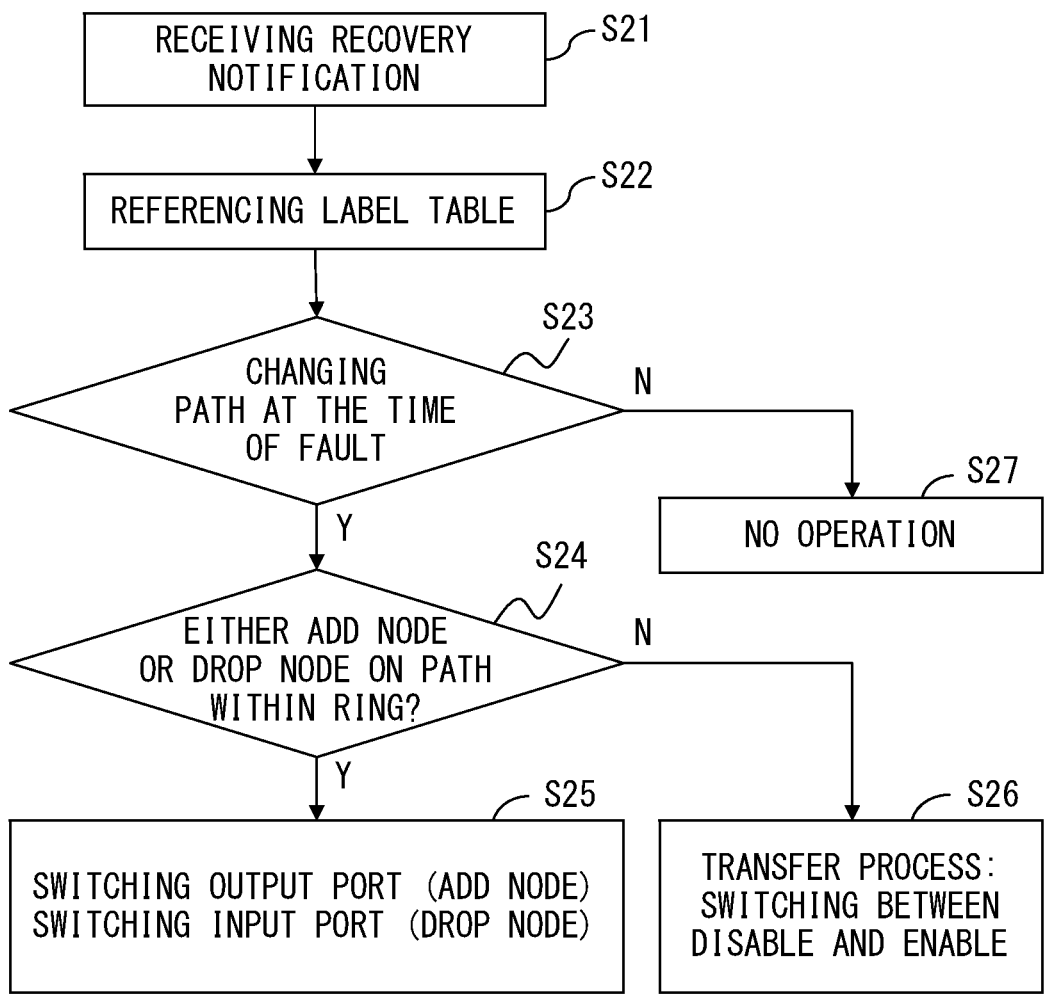
FIG. 13 is a flowchart illustrating operations of a communication node when a fault is recovered.

FIG. 13 is a flowchart illustrating operations of the communication node when the ring network recovers from a fault. Here, operations performed after the state of the ring network recovered and the recovery notification was transmitted from a communication node that has detected the recovery are described.

In step S21, each of the communication nodes receives the recovery notification. In step S22, the label switching processor 15 references the label table 12 and the forwarding table 14. Here, assume that an update history of transfer information is recorded in the label table 12 and the forwarding table 14. Namely, the label switching processor 15 recognizes the transfer information set before the fault occurred by referencing the label table 12 and the forwarding table 14.

In step S23, the label switching processor 15 checks whether or not a route had been changed when the fault occurred. Namely, whether or not the transfer information had been updated when the fault occurred is checked. If the transfer information had been updated when the fault occurred, steps S24-S24 are executed. Otherwise, the process is terminated without updating the transfer information (step S27).

Steps S24-S26 correspond to the process for restoring the table update performed in steps S6-S10 illustrated in FIG. 11 to the former state. Namely, the label switching processor 15 switches the output port to the ring in the add node. Moreover, the label switching processor 15 switches the input port from the ring in the drop node. Furthermore, the label switching processor 15 switches between "enables (forwarding a received packet)" and "disables (discarding a received packet)" in the other communication nodes.

In the above described embodiment, a label (or a tag) is attached to each packet in the add node, and the packet is transferred by using the label within the ring network. The present invention, however, is not limited to this configuration. Namely, in the ring network according to the present invention, it is not always necessary to attach a label or a tag to each packet, for example if a correspondence between identification information (such as a virtual LAN identifier) for identifying a connection between a transmitting station and a receiving station connected to the ring and a path within the ring is defined.

Figure 14:
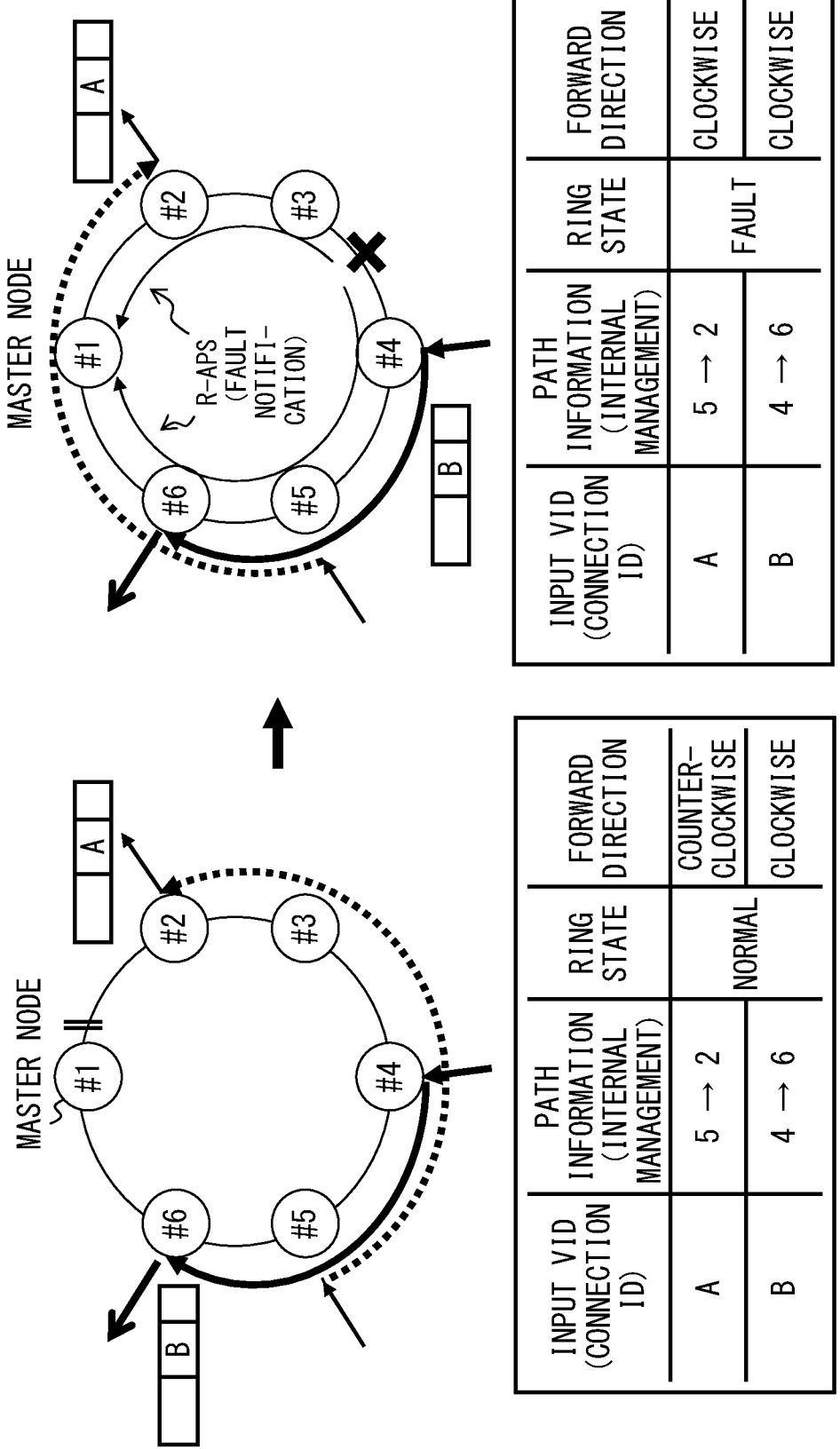
FIG. 14 illustrates an embodiment of a configuration that does not use a label.

In the example illustrated in FIG. 14, two connections A and B are established by using the ring network. Connection A is implemented by using a counterclockwise communication path extending from communication node #5 to communication node #2 via communication nodes #4 and #3. In contrast, connection B is implemented by using a clockwise communication path extending from communication node #4 to communication node #6 via communication node #5. Moreover, path information (or a path ID) that represents a path within the ring and transfer information that represents the forward direction of a packet are recorded for each connection identifier (or each virtual LAN identifier) in each of the communication nodes. These information items are distributed, for example, by the network management system 1, and are updated based on a fault notification or a recovery notification.

If a packet with the connection identifier flows into the ring network having the above described configuration, each of the communication nodes references the path information and the transfer information, which correspond to the connection identifier, and transfers or discards the packet according to a result of the reference. If a fault occurs, a redundant path is provided only for a path that is disconnected by the fault. In the example illustrated in FIG. 14, a fault occurs between communication nodes #3 and #4. In this case, a communication path for implementing connection A is switched from "#5→#4→#3→#2" to "#5→#6→#1→#2". In the meantime, a communication path for implementing connection B remains unchanged.

Figure 15:
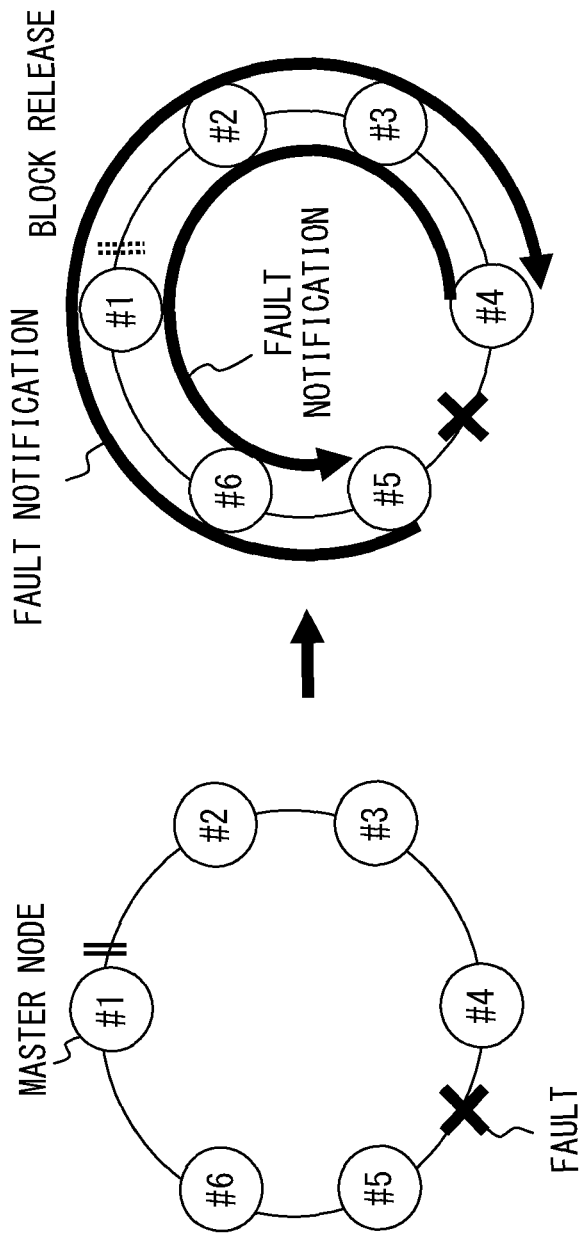
FIG. 15 is an explanatory view of another method for reporting a fault.

Furthermore, in the above described embodiment, the fault notification transmitted from a communication node that has detected the fault is terminated by the master node. The present invention, however, is not limited to this configuration. The present invention may be applicable also to a configuration where the master node does not terminate the fault notification. For instance, in the example illustrated in FIG. 15, the fault notification generated by communication node #4 is transmitted counterclockwise and is transferred up to communication node #5. Similarly, the fault notification generated by communication node #5 is transmitted clockwise and is transferred up to communication node #4.

In this configuration, each of the communication nodes receives two fault notifications. In this case, each of the communication nodes may execute the process of the flowchart illustrated in FIG. 11, for example, in accordance with the first fault notification, and may ignore the second fault notification. Alternatively, each of the communication nodes may execute the process of the flowchart illustrated in FIG. 11 upon receipt of the second fault notification.

Furthermore, a communication path is provided in the single ring network in the above described embodiment. However, the present invention may be applied also to a multi-ring configuration where a plurality of ring networks are connected. In the example illustrated in FIG. 16, two rings #1 and #2 are interconnected.

Ring #1 includes communication nodes #1-#6, and ring #2 also includes communication nodes #1-#6. However, communication nodes #2 and #3 of ring #1 respectively operate also as communication nodes #3 and #2 of ring #2. Namely, this multi-ring network is a configuration where a portion of the links of rings #1 and #2 are shared.

In the multi-ring network having the above described configuration, priorities are assigned to the rings. Here, assume that the priority of ring #1 is higher than that of ring #2. In this case, for the shared communication nodes (or links), a packet is transferred by using transfer information set for ring #1.

Assume that a connection Y for transmitting data from a transmitting station connected to communication node #5 of ring #1 to a receiving station connected to communication node #5 of ring #2 is set. Here, also assume that communication node #1 is a master node in both rings #1 and #2. In this case, the connection Y is implemented by a communication path that passes through communication nodes #5, #4, #3 and #2 of ring #1, and communication nodes #4 and #5 of ring #2, as illustrated in FIG. 16.

Figure 16:
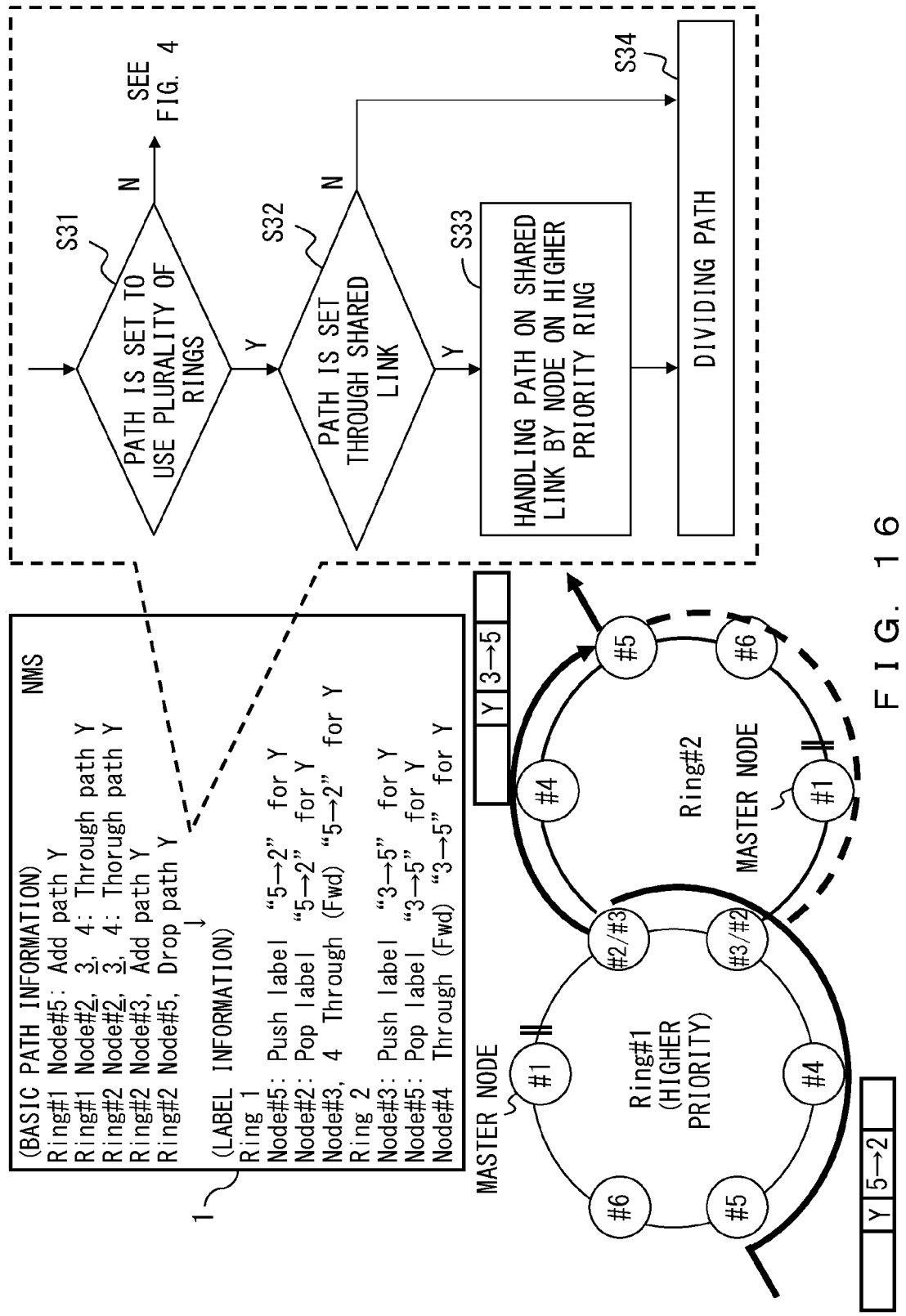
FIG. 16 illustrates a multi-ring configuration.

Here, the communication path is set by steps S31-S34 of the flowchart illustrated in FIG. 16. Namely, in step S31, whether or not the communication path uses a plurality of rings is checked. If the communication path uses only one ring, the information illustrated in FIG. 4 is set.

If the communication path uses a plurality of rings, whether or not the communication path passes through a shared link is checked in step S32. If the communication path passes through the shared link, transfer information is set in a communication node, which belongs to the ring with higher priority, in the shared link. In step S34, the path is divided. Namely, information corresponding to a connection is set for each of the rings.

Assume that a packet of the connection Y reaches communication node #5 of ring #1 in the multi-ring network having the above described configuration. In this case, communication node #5 of ring #1 attaches the label "5→2" to the packet, and transmits the packet to communication node #4. Then, this packet is transferred to communication node #2 of ring #1 via communication nodes #4 and #3. Communication node #2 of ring #1 passes the packet to communication node #3 of ring #2 after removing the label "5→2". Communication node #2 of ring #1 and communication node #3 of ring #2 may be implemented with one communication node device.

Communication node #3 of ring #2 operates as an add node. Namely, communication node #3 of ring #2 attaches a label "3→5" to the received packet, and transmits this packet to communication node #4 of ring #2. Then, this packet is transferred to communication node #5 of ring #2. Communication node #5 of ring #2 transfers the packet to the receiving station after removing the label "3→5".

If a fault occurs in the above described multi-ring network, a redundant path is provided for each of the rings. For example, if a fault occurs between communication nodes #4 and #5 of ring #2, the master node of ring #2 releases a blocking port. Moreover, communication nodes of ring #2 update the forwarding table 14. Then communication node #3 of ring #2 transfers the packet received from ring #1 counterclockwise in ring #2. This packet is transferred to communication node #5 via communication nodes #2, #1, and #6 of ring #2. Namely, a redundant path is provided in ring #2. At this time, the configuration of ring #1 remains unchanged.

As described above, in the ring network according to the embodiment, whether or not to provide a redundant path is determined for each connection when a fault occurs in a ring. Namely, a redundant path is not always provided even if a fault occurs in a ring, and whether or not to provide a redundant path is determined in accordance with a relationship between a route of a communication path for implementing each connection and a position of a fault. Accordingly, the path providing method according to the embodiment suppresses useless path switching.

Additionally, according to the path providing method of the embodiment, a redundant configuration is provided for a packet/frame of both a flow sequence (such as mp2mp) and a connection sequence (such as p2p) of a virtual LAN or the like while maintaining compatibility with an existing protection sequence in a ring network employing the protection sequence. Furthermore, a virtual LAN path and PBB-TE are allowed to be provided or to coexist in a network environment to which existing Ethernet ring protection is applied. Still further, reliability equivalent to existing technology is allowed to be maintained since the switching time for providing a redundant configuration does not increase.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. A communication path providing method for providing a communication path in a ring network having a plurality of communication nodes, one of the plurality of communication nodes being specified as a master node that provides a blocking port and releases the blocking port when a fault occurs in the ring network, comprising:

setting transfer information of data in each of the plurality of communication nodes by making the transfer information correspond to connection information for identifying a connection within the ring network to provide a first communication path;

notifying the plurality of communication nodes of a position where a fault occurs when the fault occurs in the ring network;

determining whether or not to update the transfer information in each of the communication nodes according to the position where the fault occurs; and updating the transfer information according to the position where the fault occurs in one or more of the plurality of communication nodes, and providing a second communication path having an originating node and a terminating node which are identical to the first communication path, wherein each of the plurality of communication nodes transfers input data by using the first or second communication path according to transfer information corresponding to connection information attached to the input data wherein:

each of the plurality of communication nodes has a first port for connecting to an adjacent communication node on an upstream side in the ring network, and a second port for connecting to an adjacent communication node on a downstream side in the ring network;

the connection information specifies an originating node and a terminating node of the ring network;

transfer information set in a first communication node specified as the originating node includes an instruction to output data flowing into the ring network to the first port;

transfer information set in a second communication node specified as the terminating node includes an instruction to guide data received via the second port to outside of the ring network; and when a fault occurs on the first communication path extending between the first communication node and the second communication node, the transfer information of the first communication node is updated to an instruction to output the data flowing into the ring network to the second port, and the transfer information of the second communication node is updated to an instruction to guide the data received via the first port flow to outside of the ring network.

2. The communication path providing method according to claim 1, further comprising setting the transfer information that represents the instruction to output the data received via the first port to the second port in each communication node on the second communication path extending between the first communication node and the second communication node, when a fault occurs on the first communication path.

3. The communication path providing method according to claim 1, wherein the first communication node attaches the connection information to the data flowing into the ring network.

4. The communication path providing method according to claim 1, wherein a virtual LAN identifier for identifying a virtual LAN is assigned to the data flowing into the ring network, the connection information and the transfer information of data are set correspondingly to the virtual LAN identifier in each of the plurality of communication nodes, and each of the plurality of communication nodes transfers input data according to the connection information and the transfer information, which correspond to the virtual LAN identifier assigned to the input data.

5. The communication path providing method according to claim 1, wherein the blocking port of the master node transmits a fault notification for reporting the position where the fault occurs.

6. The communication path providing method according to claim 1, wherein the ring network is a multi-ring network where a portion of a link of a first ring network and a portion of a link of a second ring network are shared, and the connection information identifies a connection by recognizing the shared link as a link belonging to one of the first and the second ring networks.

7. A communication apparatus provided in each of a plurality of communication nodes in a ring network, comprising:

a memory to store transfer information for transferring data from an originating node of the ring network to a terminating node of the ring network via a first communication path with respect to connection information for identifying a connection within the ring network;

an updating unit to update the transfer information according to a position of the communication apparatus upon receipt of a notification indicating that a fault occurs on the first communication path, and to provide a second communication path extending from the originating node to the terminating node; and a transferring unit to transfer input data by using the first or second communication path according to transfer information corresponding to connection information attached to the input data wherein, each of the plurality of communication nodes has a first port for connecting to an adjacent communication node on an upstream side in the ring network, and a second port for connecting to an adjacent communication node on a downstream side in the ring network;

the connection information specifies an originating node and a terminating node of the ring network;

transfer information set in a first communication node specified as the originating node includes an instruction to output data flowing into the ring network to the first port;

transfer information set in a second communication node specified as the terminating node includes an instruction to guide data received via the second port to outside of the ring network; and wherein the updating unit updates the transfer information to an instruction to output the data flowing into the ring network to the second port when a fault occurs on the first communication path extending between the first communication node and the second communication node, if the communication apparatus is provided in the first communication node, and the updating unit updates the transfer information to an instruction to guide the data received via the first port flow to outside of the ring network when a fault occurs on the first communication path extending between the first communication node and the second communication node, if the communication apparatus is provided in the second communication node.

8. The communication apparatus according to claim 7, wherein, the updating unit provides the transfer information that represents the instruction to output the data received via the first port to the second port when a fault occurs on the first communication path, if the communication apparatus is provided in the communication node on the second communication path extending between the first communication node and the second communication node.

9. The communication apparatus according to claim 7, further comprising an attaching unit to attach the connection information to the data flowing into the ring network, if the communication apparatus is provided in the first communication node.

10. The communication apparatus according to claim 7, wherein a virtual LAN identifier for identifying a virtual LAN is assigned to the data flowing into the ring network, the connection information and the transfer information of data are set correspondingly to the virtual LAN identifier in each of the plurality of communication nodes, and the transferring unit transfers input data according to the connection information and the transfer information, which correspond to the virtual LAN identifier assigned to the input data.

11. The communication apparatus according to claim 7, further comprising a ring protection controller to provides a blocking port to block data but to transmit a fault notification for reporting the position where the fault occurs.

12. The communication apparatus according to claim 7, wherein the ring network is a multi-ring network where a portion of a link of a first ring network and a portion of a link of a second ring network are shared, and the connection information identifies a connection by recognizing the shared link as a link belonging to one of the first and the second ring networks.

* * * * *